(12) United States Patent
Laine (10) Patent No.: US 12,246,601 B2
(45) Date of Patent: Mar. 11, 2025

(54) METHODS FOR CONTROLLING A POWER LEVEL IN AN ENERGY SOURCE OF A VEHICLE UNIT

(71) Applicant: Volvo Truck Corporation, Gothenburg (SE)

(72) Inventor: Leo Laine, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 274 days.

(21) Appl. No.: 17/908,592

(22) PCT Filed: Mar. 9, 2020

(86) PCT No.: PCT/EP2020/056183
§ 371 (c)(1),
(2) Date: Sep. 1, 2022

(87) PCT Pub. No.: WO2021/180300
PCT Pub. Date: Sep. 16, 2021

(65) Prior Publication Data
US 2023/0112013 A1    Apr. 13, 2023

(51) Int. Cl.
*B60L 15/38* (2006.01)
*B60L 7/10* (2006.01)
(Continued)

(52) U.S. Cl.
CPC ............. *B60L 15/38* (2013.01); *B60L 7/10* (2013.01); *B60L 50/60* (2019.02); *B60L 58/13* (2019.02); *B60L 2200/28* (2013.01)

(58) Field of Classification Search
CPC .. B60L 15/38; B60L 7/10; B60L 50/60; B60L 58/13; B60L 2200/28; B60L 2200/36; B60L 58/10; B60L 15/32; Y02T 10/70
See application file for complete search history.

(56) References Cited

U.S. PATENT DOCUMENTS 10,449,954 B2    10/2019  Layfield et al.
10,518,831 B2    12/2019  Wright
(Continued)

FOREIGN PATENT DOCUMENTS

DE    112019004903 T5    6/2021
EP    3290305 A1         3/2018
(Continued)

OTHER PUBLICATIONS

International Search Report and Written Opinion for International Patent Application No. PCT/EP2020/056183, mailed Nov. 16, 2020, 14 pages.
(Continued)

*Primary Examiner* — Peter D Nolan
*Assistant Examiner* — Demetra R Smith-Stewart
(74) *Attorney, Agent, or Firm* — Withrow & Terranova, PLLC (57) ABSTRACT

A method for controlling an articulated vehicle combination comprising a plurality of self-powered vehicle units, wherein each self-powered vehicle unit comprises a propulsion device and a regenerative braking device connected to an energy source, the method comprising determining a current state of charge associated with an energy source of a target vehicle unit comprised in the plurality of self-powered vehicle units, and if the current state of charge is below a desired state of charge, generating a negative torque by the regenerative braking device of the target vehicle unit, and compensating at least partly for the generated negative torque by generating a positive torque by the propulsion device of at least one source vehicle unit comprised in the plurality of self-powered vehicle units, thereby transferring an amount of energy from the energy source of the at least one source vehicle unit to the energy source of the target vehicle unit.

18 Claims, 6 Drawing Sheets

(51) Int. Cl.
    *B60L 50/60*         (2019.01)
    *B60L 58/13*         (2019.01)

(56)              References Cited

U.S. PATENT DOCUMENTS

| | | |
|---|---|---|
| 2008/0270023 A1 | 10/2008 | Kumar |
| 2011/0042154 A1* | 2/2011 | Bartel ............... B60W 10/184 |
| | | 180/11 |
| 2018/0009310 A1 | 1/2018 | Storm |
| 2018/0304944 A1* | 10/2018 | Wright ............... B62D 53/08 |
| 2019/0009760 A1 | 1/2019 | Zenner et al. |
| 2019/0291593 A1* | 9/2019 | Healy ............... B60L 15/2009 |
| 2020/0062239 A1 | 2/2020 | Layfield et al. |
| 2022/0024603 A1* | 1/2022 | Keene ............... B62B 5/0079 |
| 2023/0080456 A1* | 3/2023 | Fröjd et al. ............ B62D 53/06 |
| | | 280/419 |
| 2023/0082801 A1* | 3/2023 | Laine ............... B62D 59/04 |
| | | 280/476.1 |

FOREIGN PATENT DOCUMENTS

| | | |
|---|---|---|
| SE | 542827 C2 | 7/2020 |
| WO | 2020142829 A1 | 7/2020 |

OTHER PUBLICATIONS

International Preliminary Report on Patentability for International Patent Application No. PCT/EP2020/056183, mailed Jun. 9, 2022, 22 pages.

Notice of Opposition for European Patent Application No. 20710488.6, mailed Aug. 27, 2024, 46 pages.

\* cited by examiner

METHODS FOR CONTROLLING A POWER LEVEL IN AN ENERGY SOURCE OF A VEHICLE UNIT

This application is a 35 USC 371 national phase filing of International Application No. PCT/EP2020/056183, filed Mar. 9, 2020, the disclosure of which is incorporated herein by reference in its entirety.

TECHNICAL FIELD

The present disclosure relates to heavy-duty vehicles, such as trucks and construction equipment, and in particular to self-powered dolly vehicles comprising an energy source configured to power various dolly vehicle functions such as steering, propulsion and braking. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves.

Self-powered trailer units comprising on-board energy sources have also been proposed. Such trailer units are able to assist the tractor or prime mover during certain types of manoeuvres.

U.S. Pat. No. 10,518,831 B2 relates to self-powered steerable dolly vehicles. Methods for controlling the dolly vehicles in order to, e.g., negotiate sharp turns, are disclosed. Methods for controlling propulsion and regenerative braking operations in dependence of an upcoming vehicle route to be travelled by the dolly vehicle are also discussed.

US 2019/0291593 A1 discloses a vehicle combination comprising a towed vehicle and a towing vehicle. The towed vehicle has an electrically powered drive axle configured to supply supplemental torque to the vehicle combination. The towed vehicle also comprises an energy storage system (ESS) and an auxiliary power unit interface to supply electrical power from the energy storage system to the towing vehicle. An electric motor generator can provide motive rotational force in a first mode of operation and charge the ESS by regenerative braking in a second mode of operation.

US 2020/0062239 A1 discloses a method and apparatus for an active converter dolly for use in a tractor-trailer configuration. The apparatus includes a charge generating system for translating the mechanical motions or actions of the dolly into electricity or electrical energy so that this energy can be used to change a battery or to power other functionality for either the dolly or the tractor-trailer.

US 2008/0270023 A1 discloses an energy management system provided for use with one of a plurality of hybrid energy diesel electric vehicles. The energy management system retrieves historical data of each vehicle at incremental positions along each route to estimate an anticipated traction and/or auxiliary energy demand of the one of a plurality of vehicle at each incremental position along one of a plurality of routes. However, there is a need for more advanced control methods in order to extract the full potential of self-powered steerable dolly vehicles.

SUMMARY

It is an object of the present disclosure to provide improved methods for controlling articulated vehicle combinations comprising self-powered vehicle units such as self-powered dolly vehicle units. This object is obtained at least in part by a method for controlling an articulated vehicle combination comprising a plurality of self-powered vehicle units, wherein each self-powered vehicle unit comprises a propulsion device and a regenerative braking device connected to an energy source. The method comprises determining a current state of charge associated with an energy source of a target vehicle unit comprised in the plurality of self-powered vehicle units, and, if the current state of charge is below a desired state of charge, generating a negative torque by the regenerative braking device of the target vehicle unit. The method also comprises compensating at least partly for the generated negative torque by generating a positive torque by the propulsion device of at least one source vehicle unit comprised in the plurality of self-powered vehicle units, thereby transferring an amount of energy from the energy source of the at least one source vehicle unit to the energy source of the target vehicle unit.

The method is preferably performed when the vehicle combination is already in motion. However, scenarios can also be envisioned where the vehicle combination is at a standstill, and then brought into motion just to transfer energy between vehicle units.

An advantage of this method is that a vehicle unit with a low state of charge can be recharged by an energy transfer from another vehicle unit in the combination rather than being limited to recharging from mains charging or through regenerative braking in driving scenarios where braking is required (e.g. when the vehicle combination is traveling downhill). With the method described above, recharging of a vehicle unit can take place also while the vehicle combination is travelling on a level road or even uphill. Thus, emergency charging of a vehicle unit can be performed more or less independently from the driving scenario.

According to aspects, the target vehicle unit is a self-powered dolly vehicle and the source vehicle unit is a towing vehicle, truck or prime mover. According to other aspects, the source vehicle unit is a self-powered dolly vehicle, and the target vehicle unit is a towing vehicle, truck or prime mover. Advantageously, any vehicle unit in the combination can be a source vehicle, and any vehicle unit in the combination can be a target vehicle, enabling recharging of any vehicle unit.

According to aspects, the desired state of charge represents an energy source energy level above a minimum state of charge associated with malfunction of a control unit and/or a motion support device of the target vehicle unit. If the energy source of a vehicle unit is depleted, the vehicle unit may be unable to perform functions such as maneuvering support or emergency braking, making it advantageous to ensure that the energy source is kept at a state of charge above the minimum state of charge at all times.

According to aspects, the method comprises issuing a request for energy transfer by the target vehicle unit, wherein the generating of negative torque is postponed until at least one source vehicle unit acknowledges the request. An advantage of this is that it makes it possible to verify that another vehicle unit in the combination is able to compensate at least partly for the generated negative torque before the energy transfer operation is started. The vehicle control system is then able to plan for the energy transfer in order to minimize impact on, e.g., vehicle stability due to the energy transfer.

According to aspects, the request comprises a requested negative torque level. According to other aspects, the request comprises a requested time duration and/or an amount of energy to be transferred to the energy source of the target vehicle unit. This has the advantage of allowing for determining the state of a potential source vehicle, for example with regard to the state of charge of the energy source, and verifying that the source vehicle can safely produce a positive torque compensating for the requested negative torque, can execute an energy transfer for the requested time duration, and/or can supply the requested amount of energy without depleting its energy source below a desired state of charge.

According to aspects, the method comprises estimating a road friction condition and acknowledging the request in dependence of the estimated road friction condition. An advantage of this is that it can be verified that the road friction condition is suitable for an energy transfer operation prior to starting the energy transfer operation. Under unsuitable road friction conditions, the additional torques applied during an energy transfer operation may result in excessive wheel slippage rather than efficient energy transfer.

According to aspects, the method comprises determining an articulation angle associated with the vehicle combination and acknowledging the request in dependence of the articulation angle. An advantage of this is that an energy transfer operation can be postponed in situations where the articulation angles are such that the application of positive and negative torque to vehicle units during the energy transfer operation would cause undesirable vehicle behavior, such as the vehicle folding at coupling points between vehicle units. The amount of energy transfer, i.e., the applied positive and negative torques by the different vehicle units, can also be varied continuously in dependence of the articulation angle or angles of the vehicle combination. Thus, some energy may still be transferred even for substantial articulation angles.

According to aspects, the method comprises determining a coupling force associated with the vehicle combination and acknowledging the request in dependence of the coupling force. This has the advantage that a requested energy transfer operation can be postponed if it is anticipated to increase the coupling force at one or more coupling points in the combination beyond an acceptable limit.

According to aspects, the method comprises obtaining a planned route associated with the vehicle combination and acknowledging the request in dependence of the planned route. An advantage of this is that a requested energy transfer operation can be postponed if the vehicle is approaching a part of the route that is unsuitable for an energy transfer operation. For example, the application of a negative torque may be undesirable when travelling up a steep incline of the roadway or executing sharp turns.

According to aspects, the method comprises controlling the energy transfer operation by a central control unit of the vehicle combination, wherein the energy transfer operation comprises the generating of negative torque and the generating of positive torque. An advantage of this is that the central control unit can allocate positive and negative torque to multiple vehicle units in the combination, for example distributing the compensating positive torque over multiple source vehicle units.

According to aspects, the method comprises synchronizing an onset and a cessation of the generation of negative torque with a respective onset and cessation of the generation of positive torque. This has the advantage of, for example, allowing for the generation of positive and negative torque to start and end at approximately the same time, or for the rate of change of the positive and negative torque to be similar, allowing a more smooth energy transfer operation without jerky behavior and the like.

According to aspects, the method comprises initializing the energy transfer operation in dependence of a distance remaining until the articulated vehicle combination reaches a pre-determined geographical location. An advantage of this is that energy transfer operations can be postponed if the vehicle combination is approaching a destination where mains charging is available.

According to aspects, the method comprises compensating at least partly for the negative torque by generating a total positive torque by the propulsion devices of a plurality of source vehicle units comprised in the plurality of self-powered vehicle units. According to other aspects, the method comprises configuring each source vehicle unit to generate a positive torque contribution to the total positive torque in dependence of a state of charge and/or energy storage capacity of the respective source vehicle unit. This has the advantage of distributing the compensating positive torque over multiple source vehicles, optionally adjusting the level of positive torque for each source vehicle unit in such a way that no vehicle unit is depleted below the point of the desired charge state associated with its energy source. This way the burden of energy transfer to the target vehicle unit can be shared among the other vehicle units in the vehicle combination, which is an advantage.

The object is also obtained, at least in part, by a control unit comprising processing circuitry configured to perform the method described above.

The object can also be obtained by a computer program comprising program code means for performing the method described above when said program is run on a computer or on processing circuitry of a control unit.

There is also herein disclosed a self-powered vehicle unit comprising a propulsion device and a regenerative braking device connected to an energy source. The self-powered vehicle unit is configured to determine a current state of charge associated with the energy source, and if the current state of charge is below a desired state of charge, request energy transfer from at least one source vehicle unit at least indirectly connected to the self-powered vehicle unit. Following acknowledgement of the request, the self-powered vehicle unit is configured to generate a negative torque by the regenerative braking device of the self-powered vehicle unit, thereby transferring an amount of energy from the energy source of the at least one source vehicle unit to the energy source of the self-powered vehicle unit.

Furthermore, there is herein disclosed a self-powered vehicle unit comprising a propulsion device and a regenerative braking device connected to an energy source. The self-powered vehicle unit is configured to obtain a request for energy transfer from the self-powered vehicle unit to a target vehicle unit at least indirectly connected to the self-powered vehicle unit, determine a current state of charge of the energy source, and if the current state of charge is above a pre-determined level, acknowledge the request, and generate a positive torque by the propulsion device, thereby transferring an amount of energy from the energy source to an energy source of the target vehicle unit.

There is also disclosed herein computer programs, computer readable media, computer program products, control units and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1A:
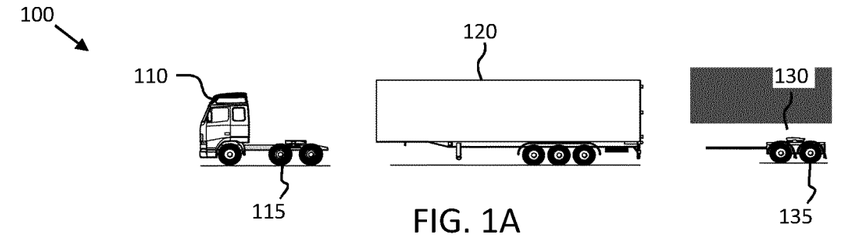
FIGS. 1A-B schematically illustrate some example heavy duty vehicle combinations.
Figure 1B:
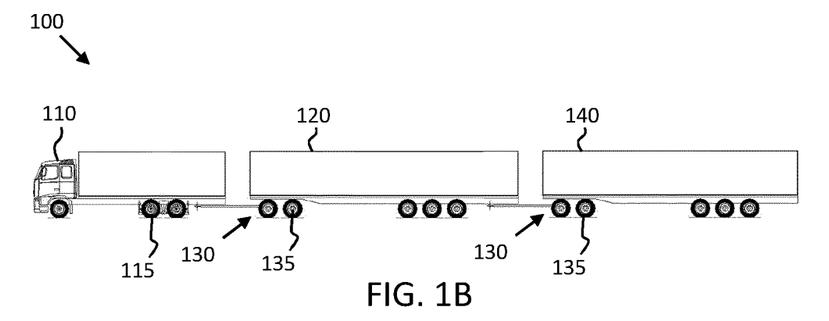

FIGS. 1A and 1B illustrate example vehicles 100 for cargo transport where the herein disclosed techniques can be applied with advantage. FIG. 1A shows a truck or towing vehicle 110 supported on wheels, at least some of which are driven wheels 115. The truck 110 is configured to tow a first trailer unit 120 in a known manner. To extend the cargo transport capability of the vehicle combination, a dolly vehicle 130 can be connected to the rear of the first trailer 120. This dolly vehicle can then tow a second trailer 140, as illustrated in FIG. 1B, where the towing vehicle 110 is now of a type which also carries some cargo. The herein disclosed techniques are applicable with a wide variety of different types of towing vehicles, including towing vehicles and prime movers arranged for autonomous drive.

A dolly vehicle 130 is traditionally a passive vehicle comprising no driven or steerable axles. It has, however, recently been shown that self-powered steerable dolly vehicles may provide both increased fuel efficiency and maneuverability. This type of dolly vehicle comprises an on-board energy source and at least one pair of driven wheels 135.

Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no electric hybridization. An example of this type of self-powered dolly vehicle will be discussed in more detail below in connection to FIG. 7.

Both the truck 110 and the self-powered steerable dolly vehicle 130 may comprise electric machines for propulsion and/or regenerative brakes for decelerating the vehicle unit while harvesting energy. The self-powered vehicle units also comprise respective energy sources. An energy source is normally a battery, super-capacitor or other device arranged to store electrical energy. However, an energy source may also comprise mechanical energy storage devices such as springs.

U.S. Pat. No. 10,518,831 B2 discloses methods for determining when to apply regenerative braking by a self-powered dolly vehicle unit and when to apply propulsion. Regenerative braking is applied when the vehicle combination has a surplus potential energy, i.e., when it is driving downhill. Propulsion is instead applied when the vehicle combination has a deficit in potential energy, i.e., when the vehicle combination is going uphill. A future route is used to plan control of the energy level in the self-powered dolly vehicle. If torque is applied by one or more vehicle units in the vehicle combination, it will be of the same sign, i.e., either braking or propulsion.

The present disclosure presents methods for transferring energy between vehicle units in an articulated vehicle combination independently of the terrain. This is accomplished by one vehicle unit, henceforth referred to as the target vehicle unit, applying a negative torque to its driven wheels. This negative torque can be exploited in order to harvest energy by, e.g., regenerative braking. The applied negative torque is then at least partly compensated for by at least one other vehicle unit in the vehicle combination, henceforth referred to as source vehicle unit(s), by applying a positive torque which at least partly negates the effect of the applied negative torque. The applied positive torque can be larger than the negative torque in order to obtain overall acceleration of the vehicle combination, or it can be smaller than the applied negative torque in order to generate over braking of the vehicle combination.

This way the roadway is used as a "drive belt" to transfer energy from the energy source of the one or more source vehicle units to the target vehicle unit. This operation can be performed even if the terrain is uphill or flat, where generally it is not desired to decelerate the vehicle combination.

A dolly vehicle unit suffering from low energy levels may not be able to perform safety critical functions such as evasive maneuvering support and emergence braking, however, by the methods disclosed herein, an emergency energy transfer can be initiated to charge a depleted energy source in a vehicle unit, even if the terrain does not allow regenerative braking without affecting the overall velocity of the vehicle combination in an undesired manner. Thus, the herein disclosed methods can be applied with advantage to avoid dangerously low energy levels in, e.g., a dolly vehicle unit.

Figure 2:
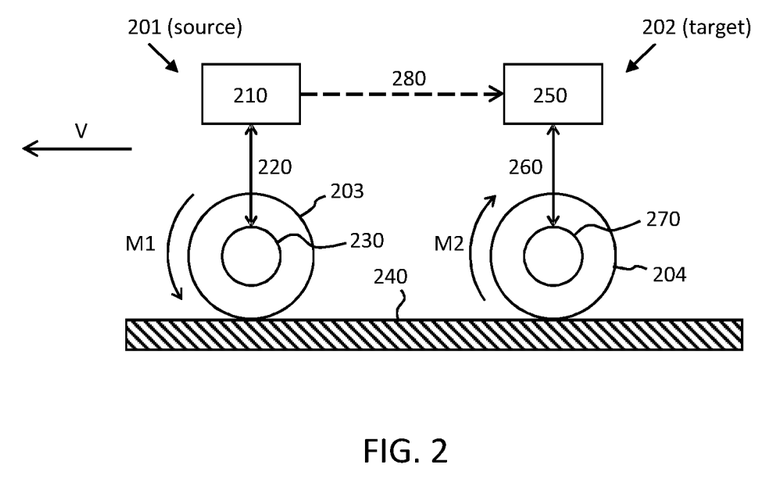
FIG. 2 schematically shows energy transfer via a roadway.

FIG. 2 schematically illustrates some of the main concepts discussed herein. A source vehicle unit 201 comprises one or more wheels 203 in contact with a roadway 240 (or other surface). The source vehicle unit 201 comprises an energy source 210 connected 220 to a propulsion device 230 arranged to generate a positive torque M1 which strives to move the vehicle unit in a direction with velocity V. The direction can be both forward and reverse. A target vehicle unit 202 is mechanically linked to the source vehicle unit 201 at least indirectly. The link may be via a drawbar or a fifth wheel connection, and it is appreciated that one or more other vehicle units can be arranged in-between the source and the target vehicle unit. The target vehicle unit 202 also comprises an energy source 250 connected 260 to a regenerative braking device 270 or other energy harvesting device arranged to generate a negative torque M2, i.e., a torque which strives to decelerate the vehicle combination as it is travelling in the direction with velocity V. This regenerative braking causes a positive influx of energy 280 to the energy source 250 of the target vehicle unit 202.

To summarize, with reference also to FIG. 7 and FIG. 8 which will be discussed in more detail below, FIG. 2 illustrates a method for controlling an articulated vehicle combination 100 comprising a plurality of self-powered vehicle units 110, 120, 130, 140. Each self-powered vehicle unit 110, 120, 130, 140 comprises a propulsion device 230, 720 and a regenerative braking device 270, 710 connected to an energy source 210, 250, 725. The method comprises determining S1 a current state of charge associated with an energy source of a target vehicle 202 unit comprised in the plurality of self-powered vehicle units 110, 120, 130, 140. If the current state of charge is below a desired state of charge, the method comprises generating S5 a negative torque M2 by the regenerative braking device 270 of the target vehicle unit 202, and compensating S6 at least partly for the generated negative torque M2 by generating a positive torque M1 by the propulsion device 230 of at least one source vehicle unit 201 comprised in the plurality of self-powered vehicle units 110, 120, 130, 140. This way an amount of energy is transferred from the energy source of the at least one source vehicle unit 201 to the energy source of the target vehicle unit 202. The energy transfer can be initialized independently of the driving scenario, since the negative torque is compensated for by the source vehicle. Thus, a downhill route segment is not required in order to replenish a dangerously depleted energy source, which is an advantage.

The method is preferably performed when the vehicle combination is already in motion V. However, scenarios can also be envisioned where the vehicle combination is at a standstill, and then brought into motion V with the sole purpose of transferring energy between vehicle units 201, 202. For instance, an autonomous vehicle may travel along a circular path for a while in order to replenish the energy source of one or more of its vehicle units. This type of charging behavior can even be performed by special charging vehicle units. Such charging vehicle units may be deployed at a terminal or facility, where they can automatically make sure that vehicle units have energy levels above some minimum energy level at all times.

The energy is transferred from the wheel or wheels 203 of the target vehicle unit, via the roadway 240, to the wheel or wheels of the target vehicle unit. Thus, the roadway is used as a drive-belt in order to transfer the energy from the energy source 210 of the source vehicle unit to the energy source 250 of the target vehicle unit. An advantage with this approach compared to the disclosure of, e.g., U.S. Pat. No. 10,518,831 B2, is that energy can be transferred more or less independently of the driving scenario. For instance, energy can be transferred to a nearly depleted self-powered dolly vehicle even if the vehicle combination is travelling on a flat stretch of road or even uphill.

The source and target vehicle units may be selected freely from the vehicle units in an articulated vehicle combination. For instance, a prime mover may be used to transfer energy to a self-powered dolly vehicle, and the self-powered dolly vehicle can be used to transfer energy to a truck or prime mover in need of recharging its batteries.

In other words, according to some aspects, the target vehicle unit 202 is a self-powered dolly vehicle 130, and the source vehicle unit 201 is a towing vehicle, truck or prime mover 110. According to other aspects, the source vehicle unit 201 is a self-powered dolly vehicle 130, and wherein the target vehicle unit 202 is a towing vehicle, truck or prime mover 110.

The techniques disclosed herein are not limited to tractors and self-powered dolly vehicles. Rather, the techniques disclosed herein can be applied to any vehicle unit comprising a regenerative braking system. For instance, the methods disclosed herein can be used with advantage also for self-powered trailer units comprising regenerative brakes and on-board energy sources. The herein disclosed techniques are applicable to cases where a plurality of vehicle units are arranged as source vehicle units and a plurality of vehicle units are arranged as target vehicle units. In other words, one or more source vehicle units may be used to simultaneously transfer energy to one or more target vehicle units in a vehicle combination. Note that the prime mover may be powered by a combustion engine or a hybrid engine.

Both the towing vehicle 110 and the steerable dolly vehicle 130 may comprise control units, which will be discussed in more detail below in connection to FIG. 9. These control units can be arranged according to a layered functional architecture where some functions may be comprised in a traffic situation management (TSM) layer and some other functions may be comprised in a vehicle motion management (VMM) layer.

Generally, the TSM layer plans vehicle operation with a time horizon of, e.g., 10 seconds. This time frame for instance corresponds to the time it takes for the vehicle to negotiate a curve, i.e., to transition from driving straight to entering the curve and then exiting the curve again. The TSM layer continuously requests desired acceleration profiles ($a_{req}$) and curvature profiles ($c_{req}$) from the VMM layer.

The VMM layer operates with a time horizon of about 1 second or so, and continuously transforms the acceleration profiles and curvature profiles into control commands, sometimes referred to as requests, for the various motion support device (MSD) functions on the vehicle, i.e., it among other things performs MSD coordination.

Figure 3:
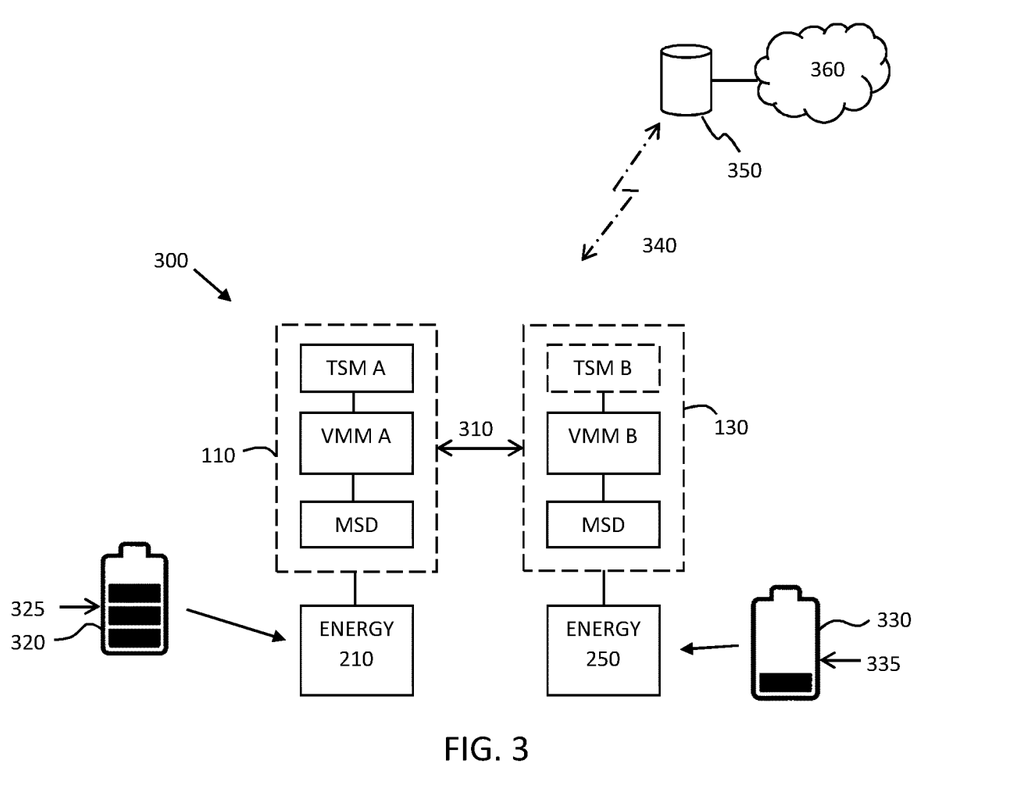
FIG. 3 illustrates a vehicle control system.

FIG. 3 schematically shows an example vehicle control stack 300 in which various vehicle control functions are incorporated. The towing vehicle 110 comprises one stack, and the dolly vehicle 130 comprises another stack. The two stacks are connected via an interface 310. A truck comprising a control unit implementing both TSM and VMM functions may then act as master, while the one or more dolly vehicles in a vehicle combination operate in a slave mode. Thus, although the control unit in the dolly vehicle 130 may comprise a stand-alone TSM function (TSM B), this function is at least partly inactivated in FIG. 3 since the TSM functions are being executed by the master control unit in the truck 110.

Additionally, the vehicle control stack may comprise a wireless connection 340 to a remote server or processing unit 350. The remote server or processing unit 350 may in turn be connected to or form part of a remote network. Information communicated by the vehicle control stack 300 to the remote server or processing unit 350 may comprise the energy level of each energy source in the articulated vehicle combination as well as data from sensors on the vehicle, e.g. regarding road friction or traffic conditions. Information communicated to the vehicle control stack 300 from the remote server or processing unit 350 may comprise instructions on energy level management.

If the remote server or processing unit is arranged to aggregate information from multiple vehicles in a fleet, the instructions on energy level management may be adapted to ensure that the energy sources of vehicle units that will remain in operation for an extended time are not depleted, while energy sources of vehicle units that are scheduled to be parked in a location where they can be charged may be depleted to a larger extent. Using information on road and traffic conditions from multiple vehicles, the instructions could also be adapted to ensure that charging of an energy source by energy transfer between vehicle units is not planned for a stretch of road where the conditions are unsuitable, e.g. where the road friction is low.

The control stacks of each vehicle unit can be used to manage energy levels 320, 330 in the respective energy sources in a distributed or centralized manner, as will be discussed in more detail below. Each energy source may be associated with a desired state of charge which represents an energy source energy level above a minimum state of charge 325, 335 associated with malfunction of a control unit and/or a motion support device of the target vehicle unit 202. For instance, a self-powered vehicle unit having a totally depleted energy source may not be able to provide sufficient power for an on-board control unit to operate, and thus not perform any control functions. An insufficient energy level may also render motion support devices such as steering, propulsion and braking useless. The minimum state of charge and the desired state of charge will depend on, among other things, the type of vehicle unit, the type of energy source, and the driving scenario. As an example, a desired state of charge may correspond to at least 20% of the energy that the energy source can store at full charge, while the minimum state of charge may correspond to 10% or so of the energy stored at full charge.

In performing a transfer of energy between a source vehicle unit and a target vehicle unit, it may be necessary to consider not only the state of charge of the target vehicle energy source but also the state of charge of the source vehicle energy source and the conditions under which the source vehicle is operating. For example, if the state of charge of the source vehicle is also near its minimum state of charge, performing an energy transfer may not be feasible. The communication interface 310 between the control stacks of each vehicle unit can be used to coordinate transfers of energy in dependence of the state of charge of each vehicle energy source and the operating conditions of each vehicle unit.

To this end, there is also disclosed herein a self-powered vehicle unit 110, 120, 130, 140 comprising a propulsion device 270, 720 and a regenerative braking device 270, 710 connected to an energy source 250, 725. The self-powered vehicle unit 110, 120, 130, 140 is configured to determine a current state of charge associated with the energy source 250. If the current state of charge is below a desired state of charge, the vehicle unit is configured to request energy transfer from at least one source vehicle unit 201 at least indirectly connected to the self-powered vehicle unit. Following acknowledgement of the request, the vehicle unit will generate a negative torque M2 by the regenerative braking device 270 of the self-powered vehicle unit 202, thereby transferring an amount of energy from the energy source of the at least one source vehicle unit 201 to the energy source of the self-powered vehicle unit 202.

There is also disclosed a self-powered vehicle unit 110, 120, 130, 140 comprising a propulsion device 230, 720 and a regenerative braking device 230, 710 connected to an energy source 210, 725. The self-powered vehicle unit 110, 120, 130, 140 is configured to obtain a request for energy transfer from the self-powered vehicle unit to a target vehicle unit 202 at least indirectly connected to the self-powered vehicle unit. The self-powered vehicle unit is also configured to determine a current state of charge of the energy source 210 and, if the current state of charge is above a pre-determined level, acknowledge the request. The self-powered vehicle unit is configured to then generate a positive torque M1 by the propulsion device 230, thereby transferring an amount of energy from the energy source to an energy source of the target vehicle unit 202.

Figure 4:
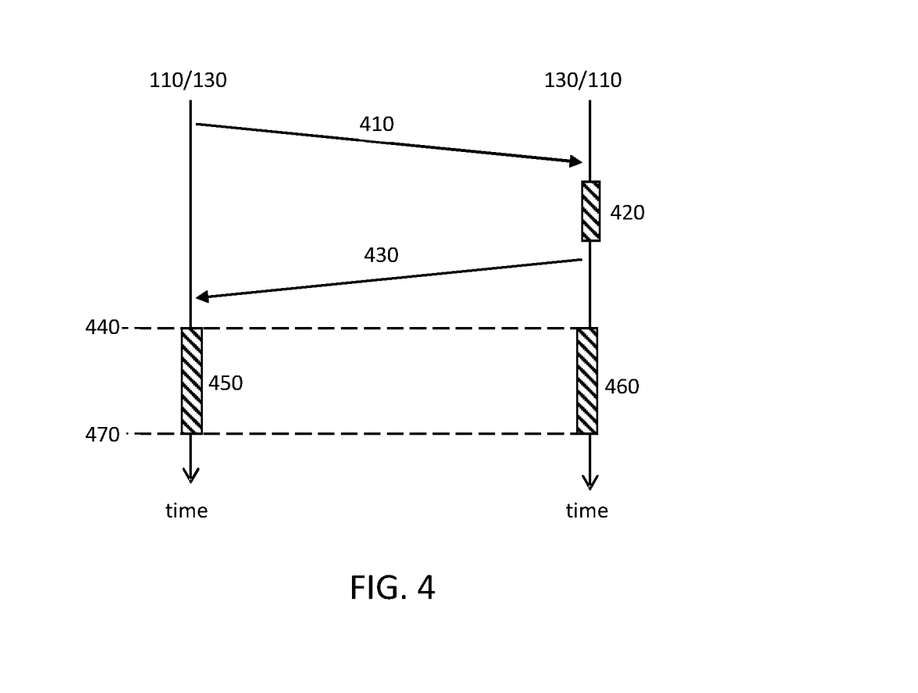
FIG. 4 is a signaling chart illustrating exchange between control units.

FIG. 4 illustrates an example exchange of messages over time between vehicle units in an articulated vehicle combination such as the vehicle combinations 100 shown in FIG. 1. The exchange of messages comprises a request 410 for energy transfer, a processing 420 of the request, and an acknowledgement of the request 430. Processing of the request may involve determining the current state of charge of the energy source and comparing it to the lowest state of charge where energy transfer from the vehicle unit to a target vehicle unit is allowed. This ensures that the energy transfer does not lower the state of charge of the source vehicle below its desired state of charge. Processing of the request may also include determining other parameters that influence the current and imminent energy requirements of the vehicle unit, such as the inclination and surface friction of the road.

The lowest state of charge where energy transfer from the vehicle unit to a target vehicle unit is allowed will depend on several factors, such as the vehicle type, the type of energy source, and the driving scenario. As an example, the lowest state of charge where energy transfer from the vehicle unit is allowed may be 20-30% of the energy that can be stored by the energy source at full charge.

Acknowledgement of the request 430 may be a simple confirmation of the energy transfer, or it may comprise data on the proposed duration of the energy transfer, the amount of energy transferred, and the timing of onset and cessation of the energy transfer. Optionally, the acknowledgement step may comprise multiple messages between the vehicle units according to an automated process for establishing the duration of the energy transfer, the amount of energy transferred, and the timing of the energy transfer.

Onset of the energy transfer 440 may be synchronized as described above, or optionally it may be implicitly synchronized, for example by the target vehicle unit applying a negative torque and the VMM allocating positive torque to the other vehicle units in the combination.

The energy transfer operation 450, 460 comprises application of negative torque by the target vehicle and application of positive torque by at least one source vehicle unit in the combination. Control of the energy transfer operation may be centralized or distributed over the vehicle units in the combination.

As for the onset of energy transfer 440, the cessation of energy transfer may be synchronized as previously described, or optionally it may be implicitly synchronized.

Figure 8:
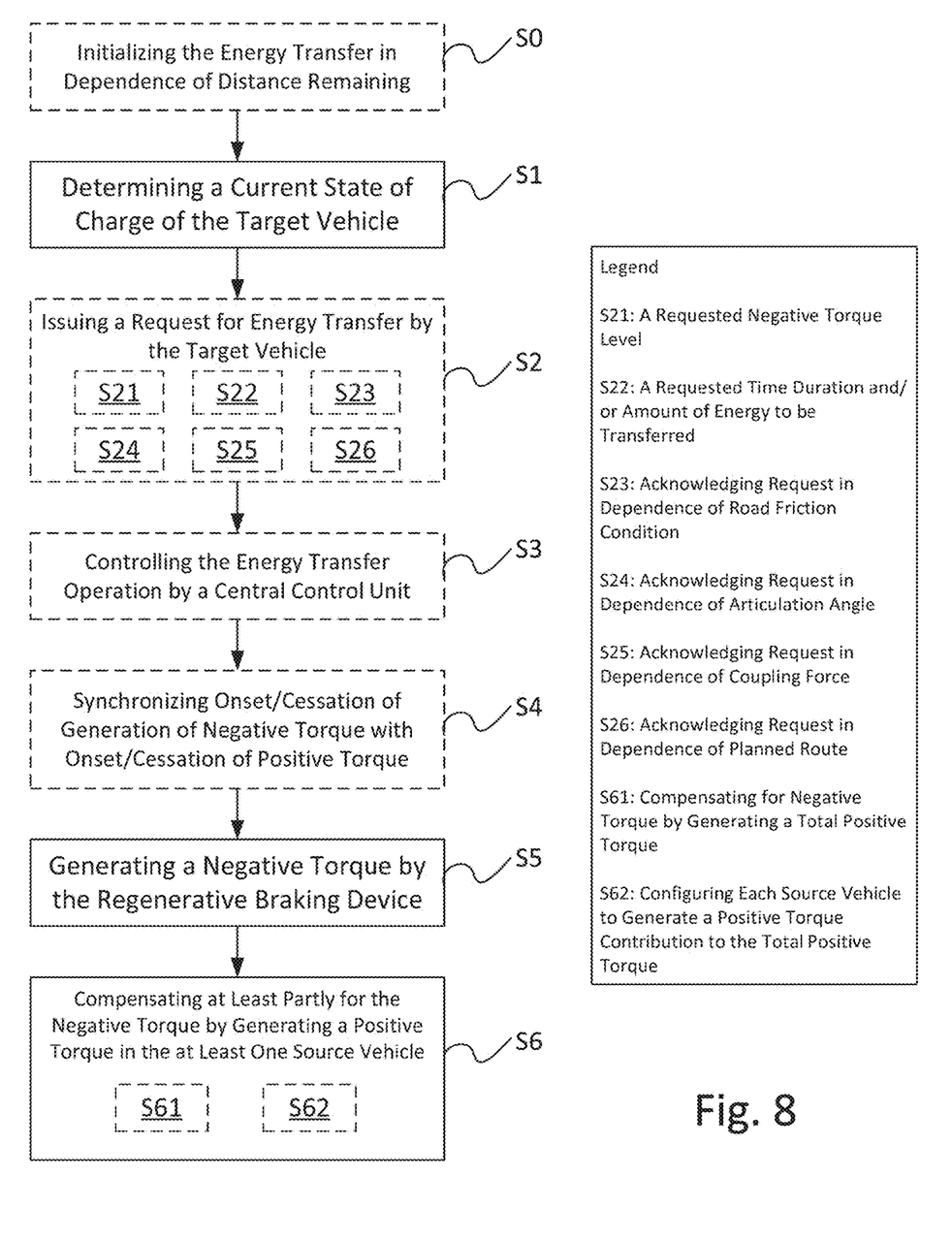
FIG. 8 is a flow chart illustrating methods.

With reference to FIG. 8, the method described previously may optionally comprise issuing S2 a request for energy transfer by the target vehicle unit 202, wherein the generating of negative torque M2 is postponed until at least one source vehicle unit 201 acknowledges the request. This can ensure that negative torque is not generated until it is verified that another vehicle unit in the combination is able to apply a positive torque. The request may also comprise S21 a requested negative torque level.

Optionally, the request may comprise S22 a requested time duration and/or an amount of energy to be transferred to the energy source of the target vehicle unit 202. This allows for determining the state of charge of the energy source of a potential source vehicle in the combination and estimating the ability of said source vehicle to provide the requested energy transfer. If the requested charge transfer would deplete the energy source of the potential source vehicle below its desired charge state the potential source vehicle may not acknowledge the request. More optionally, the potential source vehicle may acknowledge the request with a limitation on the time duration and/or amount of energy to be transferred.

Optionally, the method may also comprise estimating a road friction condition and acknowledging S23 the request in dependence of the estimated road friction condition. This makes it possible to prevent energy transfer from being attempted in cases where the road friction conditions are not suitable for using the road as a drivebelt. For example, if road friction is too low, attempting to transfer energy according to the method previously described may instead result in excessive wheel slippage. Whether a road friction condition is suitable for using the road as a drivebelt will depend on, for example, the vehicle type, the type of tire used on the vehicle, and the driving scenario. Methods for estimating road friction are well known and will therefore not be discussed in more detail herein.

Optionally, the method may comprise determining an articulation angle a1, a2, a3 associated with the vehicle combination 100 and acknowledging S24 the request in dependence of the articulation angle a1, a2, a3.

Figure 5:
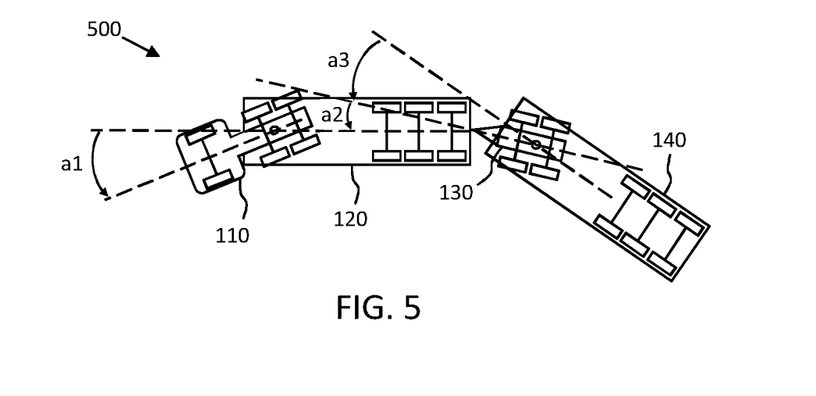
FIGS. 5-6 schematically illustrate vehicle states.

FIG. 5 shows a vehicle combination 500 as it executes a turning maneuver. The different vehicle units then exhibit articulation angles a1-a3. These articulation angles can be determined using, e.g., articulation angle sensors or global positioning receivers arranged on the different vehicle units. The articulation angle can also be determined by vision-based sensors or radar transceivers arranged to detect an angle between two consecutive vehicle units in a combination vehicle.

Attempting an energy transfer according to the methods described herein in a situation where one or more of the articulation angles is large can cause undesired vehicle behavior. For example, if a towed vehicle unit is applying a positive compensation torque while the articulation angle between it and other vehicle units is large, this may cause the vehicle combination to fold on itself at the connection point (also known as "jackknifing"). At what value the articulation angle is to be considered large depends on, among other things, the vehicle type and driving scenario. For example, a large articulation angle could mean an articulation angle of 15° or more.

Present information about the articulation angles in the vehicle combination, the VMM may allocate positive compensation torque among the possible source vehicles in dependence of the articulation angle and the maneuver being undertaken. For instance, the VMM can apply torques to control the vehicle and at the same time transfer energy between the different units. Optionally, the method may comprise determining an articulation angle a1, a2, a3 associated with the vehicle combination 100 and applying torques at magnitudes set in dependence of the articulation angle. For instance, a very small articulation angle may result in more torque being applied compared to the case where the articulation angle is larger. The amount of torque applied may, e.g., be approximately proportional to the inverse of the articulation angle.

Optionally, the method may comprise determining a coupling force associated with the vehicle combination 100 and acknowledging S25 the request in dependence of the coupling force.

Figure 6:
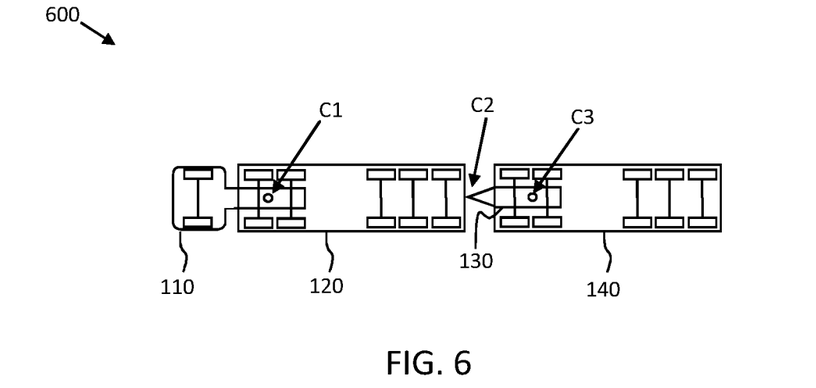

FIG. 6 shows a vehicle combination 600 with coupling forces C1, C2, C3. The coupling forces can be determined by force sensors arranged at the connection points or articulation points between vehicle units. Coupling forces are normally not allowed to exceed certain limits. These limits depend, among other things, on the coupling type and the vehicle type.

Energy transfer between vehicle units in the combination will generally lead to a temporary increase in the coupling forces, so if some connection points are already associated with a coupling force, the energy transfer might increase the coupling force above the allowed limit. In such a case the energy transfer operation may not be possible, and the request not acknowledged.

The method may also comprise obtaining a planned route associated with the vehicle combination 100 and acknowledging S26 the request in dependence of the planned route. There may be parts of the planned route where an energy transfer according to the disclosed method is not possible. As an example, a steep incline of the roadway may require application of substantial positive torque from as many vehicle units as possible, with no possibility of safely applying a negative torque in the target vehicle unit and a compensating positive torque in other vehicle units. When approaching such a part of the planned route a requested energy transfer may need to be postponed. The impact of the steepness of road will depend on, among other things, the type of vehicle and the driving scenario. For example, under some circumstances a 20-degree incline could present a situation where a requested energy transfer may need to be postponed.

A regenerative braking applied at a rearward vehicle unit has a straightening effect on an articulated vehicle combination. This may not be desirable if e.g. the vehicle combination is about to execute a turn. In such a situation the energy transfer could also be postponed or interrupted.

The method may also comprise controlling S3 the energy transfer operation by a central control unit of the vehicle combination 100, wherein the energy transfer operation comprises the generating of negative torque and the generating of positive torque. The central control unit may be a central master VMM. Said control unit is arranged to have access to information about all vehicle units in the combination, this information for example comprising the state of charge of the vehicle unit energy source and the articulation angles and coupling forces associated with the vehicle unit. The control unit is further arranged to allocate torques to the vehicle units in the combination, both to obtain a desired vehicle behavior and to achieve a desired energy transfer from one or more vehicle units to another vehicle unit.

The method may also comprise synchronizing S4 an onset and a cessation of the generation of negative torque with a respective onset and cessation of the generation of positive torque. Synchronizing the onset and cessation of negative and positive torque can entail ensuring that generation of positive torque and generation of negative torque starts approximately at the same time. For example, the generation of positive and negative torque may be synchronized to start within 10 s of each other, or within a short time interval. Synchronizing can also entail ensuring that the rate of change of the torque at onset and cessation is the same between the source and target vehicle units.

The method may also comprise initializing S0 the energy transfer operation in dependence of a distance remaining until the articulated vehicle combination 100, 500, 600 reaches a pre-determined geographical location. As an example, if the vehicle is approaching a destination where mains charging is available, a requested energy transfer may be postponed, or the amount of energy transferred may be reduced.

The method may also comprise compensating S61 at least partly for the negative torque by generating a total positive torque by the propulsion devices of a plurality of source vehicle units 201 comprised in the plurality of self-powered vehicle units 110, 120, 130, 140. In other words, the positive torque may be distributed over multiple source vehicles that all transfer energy to the target vehicle. As previously described, there can also be multiple target vehicles simultaneously applying a negative torque.

The method may also comprise configuring S62 each source vehicle unit to generate a positive torque contribution to the total positive torque in dependence of a state of charge and/or energy storage capacity of the respective source vehicle unit. For example, in a scenario where a target vehicle requests an energy transfer and one of the potential source vehicles has a lower state of charge than the others, this potential source vehicle may contribute less to the energy transfer. In this way the energy transfer can be performed without depleting any of the source units below a minimum state of charge.

Figure 7:
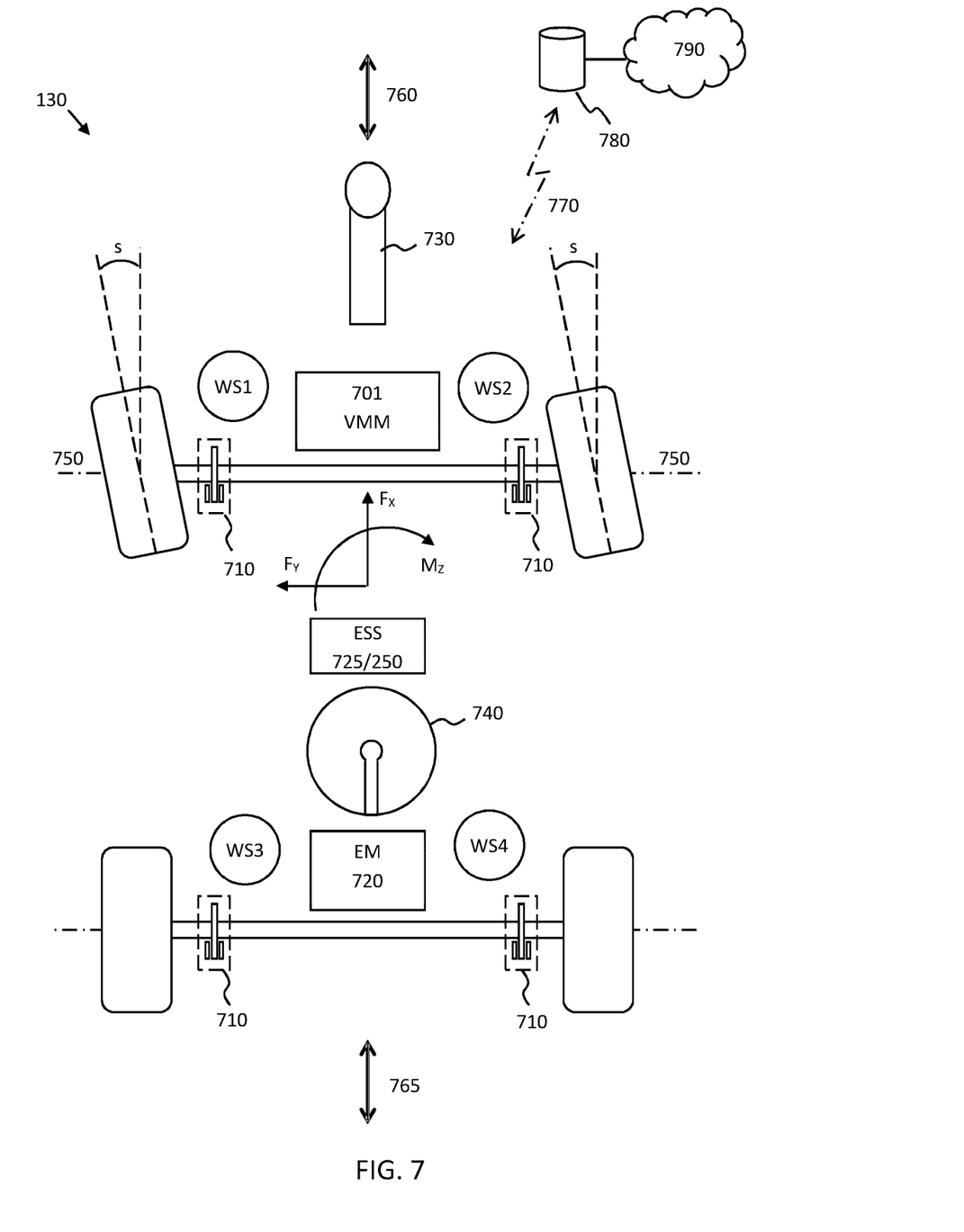
FIG. 7 schematically illustrates details of a self-powered dolly vehicle.

FIG. 7 shows aspects of the disclosed self-powered steerable dolly vehicle 130 where the methods discussed above can be applied with advantage. The dolly vehicle 130 comprises a steerable axle 750. This particular dolly vehicle also comprises a set of service brakes 710, here shown as disc brakes, although drum brakes or retarders are equally possible. The dolly vehicle also comprises an electric machine 720 and associated electrical energy storage (ESS) 725, which means that the dolly is self-powered and able to move both itself and one or more towed trailers with or without the assistance of a truck or prime mover vehicle 110. The electric machine 720 can be used both for propulsion as well as for regenerative braking. Propulsion drains the energy source 725 while regenerative braking replenished the energy source 725.

The dolly vehicle may be connected to truck or forward vehicle unit via a drawbar connection 730. A trailer may be connected to the dolly via a fifth wheel connection 740. The dolly vehicle 130 comprises one or more sensors arranged to determine an articulation angle of the drawbar connection 730.

A control unit 701 is arranged on the dolly vehicle and configured to control the various MSDs on the dolly vehicle, i.e., the brakes, the electric machine, the suspension, and in particular the steering. The control unit implements the type of VMM functions discussed above and can be configured in a master mode or in a slave mode depending on operating scenario. This control unit 701 may be communicatively coupled to a forward part of a vehicle combination via a forward interface 760, and to a rearward part of a vehicle combination via a rearward interface 765.

Notably, the control unit 701 may also be connected to a remote control unit or server 780 via a wireless link 770. This remote control unit may be connected to a communications network 790, such as a communications network defined by the third generation partnership program, 3GPP. Examples of such networks include 4G, 5G and 6G communication networks, as well as networks in the 802.11 family, in particular 802.11p.

The dolly vehicle may furthermore comprise wheel speed sensors WS1-WS4 configured to measure wheel speeds. This enables the control unit 701 to perform fine grained slip control on the wheels using the service brakes and the electric machine. For instance, the control unit 701 on the dolly unit may receive vehicle state data, comprising vehicle velocity, in its own coordinate system via one of the interfaces 760, 765 and 770, and based on this velocity determine wheel slip, in accordance with SAE J670 (SAE Vehicle Dynamics Standards Committee Jan. 24, 2008), as $$\lambda = \frac{R\omega - v_x}{\max(|R\omega|, |v_x|)}$$

where R is an effective wheel radius in meters, ω is the angular velocity of the wheel obtained from the wheel speed sensor, and $v_x$ is the longitudinal speed of the wheel (in the coordinate system of the wheel). The regenerative braking is optionally performed under a slip limit constraint, meaning that braking is decreased as soon as wheel slip goes above the configured slip limit. When this happens during an energy transfer operation, an alarm signal may be issued to the source vehicle unit or to a master control unit indicating that the roadway is not able to support the level of energy transfer currently attempted.

The self-powered dolly vehicle 130 may also comprise force sensors and an inertial measurement unit (IMU) configured to monitor and/or estimate forces acting on the dolly vehicle. These forces may comprise longitudinal forces $F_x$, lateral forces $F_y$, and moments $M_z$. Any energy transfer operations involving the dolly vehicle 130 may optionally be performed in dependence of the current forces acting on the dolly vehicle. An ongoing energy transfer operation may be suspended in case one or more forces or moments goes above some pre-configured threshold.

FIG. 8 is a flow chart illustrating methods which summarize the discussions above and the capabilities of the herein disclosed control units and vehicle units. FIG. 8 illustrates a method for controlling an articulated vehicle combination 100, 500, 600 comprising a plurality of self-powered vehicle units 110, 120, 130, 140, wherein each self-powered vehicle unit 110, 120, 130, 140 comprises a propulsion device 230, 270, 720 and a regenerative braking device 230, 270, 710 connected to an energy source 210, 250, 725, the method comprising determining S1 a current state of charge associated with an energy source of a target vehicle 202 unit comprised in the plurality of self-powered vehicle units 110, 120, 130, 140, and if the current state of charge is below a desired state of charge, generating S5 a negative torque M2 by the regenerative braking device 270 of the target vehicle unit 202, and compensating S6 at least partly for the generated negative torque M2 by generating a positive torque M1 by the propulsion device 230 of at least one source vehicle unit 201 comprised in the plurality of self-powered vehicle units 110, 120, 130, 140, thereby transferring an amount of energy from the energy source of the at least one source vehicle unit 201 to the energy source of the target vehicle unit 202.

According to aspects, the target vehicle unit 202 is a self-powered dolly vehicle 130, and wherein the source vehicle unit 201 is a towing vehicle, truck or prime mover 110.

According to aspects, the source vehicle unit 201 is a self-powered dolly vehicle 130, and wherein the target vehicle unit 202 is a towing vehicle, truck or prime mover 110.

According to aspects, the desired state of charge represents a energy source energy level above a minimum state of charge associated with malfunction of a control unit and/or a motion support device of the target vehicle unit 202.

According to aspects, the method also comprises issuing S2 a request for energy transfer by the target vehicle unit 202, wherein the generating of negative torque M2 is postponed until at least one source vehicle unit 201 acknowledges the request.

According to aspects, the request comprises S21 a requested negative torque level.

According to aspects, the request comprises S22 a requested time duration and/or an amount of energy to be transferred to the energy source of the target vehicle unit 202.

According to aspects, the method comprises estimating a road friction condition and acknowledging S23 the request in dependence of the estimated road friction condition.

According to aspects, the method comprises determining an articulation angle a1, a2, a3 associated with the vehicle combination 100 and acknowledging S24 the request in dependence of the articulation angle a1, a2, a3.

According to aspects, the method comprises determining a coupling force associated with the vehicle combination 100 and acknowledging S25 the request in dependence of the coupling force.

According to aspects, the method comprises obtaining a planned route associated with the vehicle combination 100 and acknowledging S26 the request in dependence of the planned route.

According to aspects, the method comprises comprising controlling S3 the energy transfer operation by a central control unit of the vehicle combination 100, wherein the energy transfer operation comprises the generating of negative torque and the generating of positive torque.

According to aspects, the method comprises synchronizing S4 an onset and a cessation of the generation of negative torque with a respective onset and cessation of the generation of positive torque.

According to aspects, the method comprises initializing S0 the energy transfer operation in dependence of a distance remaining until the articulated vehicle combination 100, 500, 600 reaches a pre-determined geographical location.

According to aspects, the method comprises compensating S61 at least partly for the negative torque by generating a total positive torque by the propulsion devices of a plurality of source vehicle units 201 comprised in the plurality of self-powered vehicle units 110, 120, 130, 140.

According to aspects, the method comprises configuring S62 each source vehicle unit to generate a positive torque contribution to the total positive torque in dependence of a state of charge and/or energy storage capacity of the respective source vehicle unit.

Figure 9:
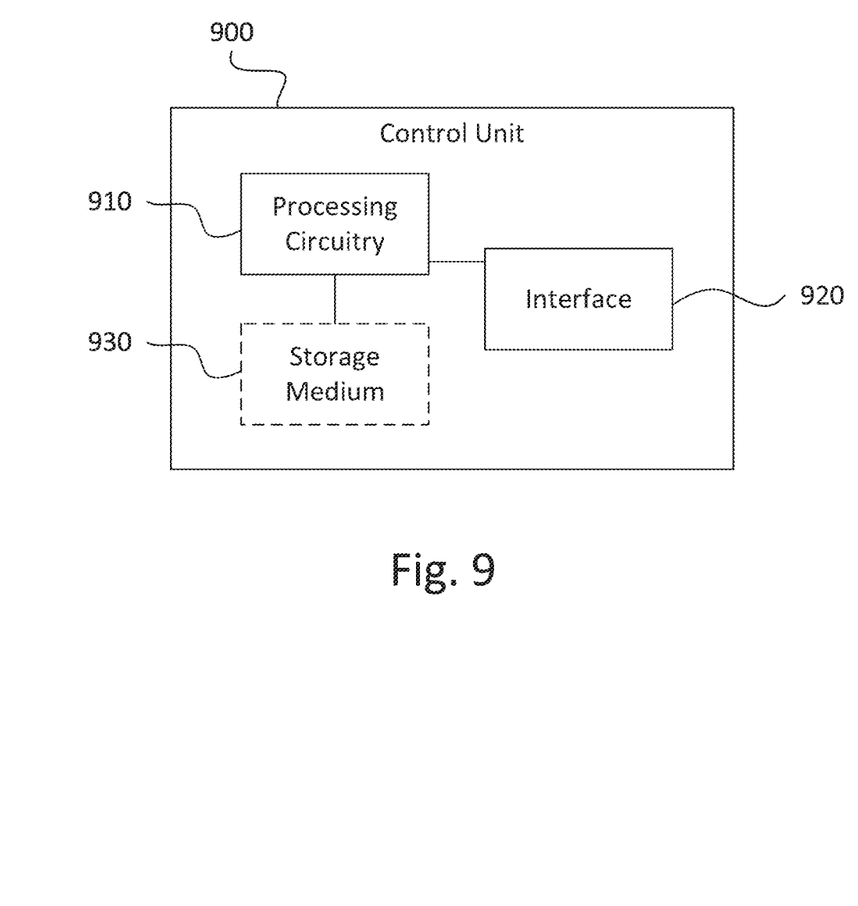
FIG. 9 schematically illustrates a control unit.

FIG. 9 schematically illustrates, in terms of a number of functional units, the components of a control unit 900 according to embodiments of the discussions and methods disclosed herein. This control unit 900 may be comprised in the vehicle 100, e.g., in the form of a VMM unit. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 10. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
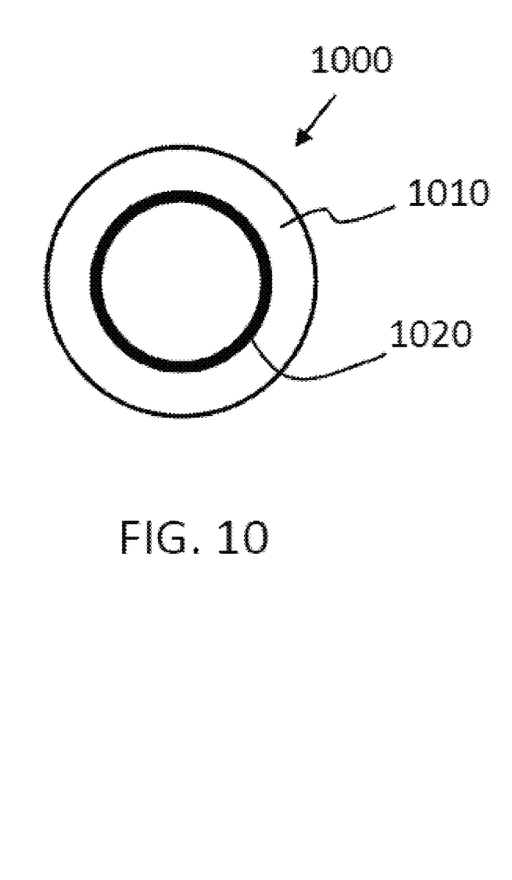
FIG. 10 shows an example computer program product.

FIG. 10 illustrates a computer readable medium 1010 carrying a computer program comprising program code means 1020 for performing, e.g., the methods illustrated in FIG. 8, when said program product is run on a computer. The computer readable medium and the code means may together form a computer program product 1000.

The invention claimed is:

1. A method for controlling an articulated vehicle combination comprising a plurality of self-powered vehicle units, wherein each self-powered vehicle unit comprises a propulsion device and a regenerative braking device connected to an energy source, the method comprising the steps of:
   determining a current state of charge associated with an energy source of a target vehicle unit of the plurality of self-powered vehicle units, and
   if the current state of charge is below a desired state of charge,
   issuing a request for energy transfer by the target vehicle unit,
   generating a negative torque by the regenerative braking device of the target vehicle unit, where generating the negative torque is postponed until at least one source vehicle unit acknowledges the request, and
   compensating, at least partly, for the generated negative torque by generating a positive torque by the propulsion device of the at least one source vehicle unit of the plurality of self-powered vehicle units,
   thereby transferring an amount of energy from an energy source of the at least one source vehicle unit to the energy source of the target vehicle unit;
   wherein the method further comprises at least one of the following steps (i) to (iii):
   (i) synchronizing an onset and a cessation of the generation of negative torque with a respective onset and cessation of the generation of positive torque,
   (ii) initializing the energy transfer operation in dependence of a distance remaining until the articulated vehicle combination reaches a pre-determined geographical location, and
   (iii) compensating, at least partly, for the negative torque by generating a total positive torque by the propulsion devices of a plurality of source vehicle units of the plurality of self-powered vehicle units.

2. The method of claim 1, wherein the target vehicle unit is a self-powered dolly vehicle, and wherein the source vehicle unit is a towing vehicle, truck or prime mover.

3. The method of claim 1, wherein the source vehicle unit is a self-powered dolly vehicle, and wherein the target vehicle unit is a towing vehicle, truck or prime mover.

4. The method of claim 1, wherein the desired state of charge represents an energy source energy level above a minimum state of charge associated with malfunction of a control unit and/or a motion support device of the target vehicle unit.

5. The method of claim 1, wherein the request comprises a requested negative torque level.

6. The method of claim 1, wherein the request comprises a requested time duration and/or an amount of energy to be transferred to the energy source of the target vehicle unit.

7. The method of claim 1, further comprising: estimating a road friction condition and acknowledging the request in dependence of the estimated road friction condition.

8. The method of claim 1, further comprising: determining an articulation angle associated with the articulated vehicle combination and acknowledging the request in dependence of the articulation angle.

9. The method of claim 1, further comprising: determining a coupling force associated with the articulated vehicle combination and acknowledging the request in dependence of the coupling force.

10. The method of claim 1, further comprising: obtaining a planned route associated with the articulated vehicle combination and acknowledging the request in dependence of the planned route.

11. The method of claim 1, further comprising: synchronizing an onset and a cessation of the generation of negative torque with a respective onset and cessation of the generation of positive torque.

12. The method of claim 1, further comprising: initializing the energy transfer operation in dependence of a distance remaining until the articulated vehicle combination reaches a pre-determined geographical location.

13. The method of claim 1, further comprising: compensating, at least partly, for the negative torque by generating a total positive torque by the propulsion devices of a plurality of source vehicle units of the plurality of self-powered vehicle units.

14. The method of claim 13, further comprising: configuring each source vehicle unit to generate a positive torque contribution to the total positive torque in dependence of a state of charge and/or energy storage capacity of the respective source vehicle unit.

15. A control unit comprising processing circuitry configured to perform the steps of claim 1.

16. A computer program product comprising non-transitory computer readable medium having stored thereon a computer program comprising instructions for performing the steps of the method of claim 1 when the program is run on a computer or on processing circuitry of a control unit.

17. A self-powered vehicle unit comprising a propulsion device and a regenerative braking device connected to an energy source, wherein the self-powered vehicle unit is configured to:
   determine a current state of charge associated with the energy source, and
   if the current state of charge is below a desired state of charge,
   request energy transfer from at least one source vehicle unit at least indirectly connected to the self-powered vehicle unit, and, following acknowledgement of the request, and
   generate a negative torque by the regenerative braking device of the self-powered vehicle unit,
   thereby transferring an amount of energy from the energy source of the at least one source vehicle unit to the energy source of the self-powered vehicle unit;
   wherein the self-powered vehicle unit is further configured to perform at least one of the following items (i) to (iii):
   (i) synchronize an onset and a cessation of the generation of negative torque with a respective onset and cessation of the generation of positive torque,
   (ii) initialize the energy transfer operation in dependence of a distance remaining until the articulated vehicle combination reaches a pre-determined geographical location, and
   (iii) compensate, at least partly, for the negative torque by generating a total positive torque by the propulsion devices of a plurality of source vehicle units of the plurality of self-powered vehicle units.

18. A self-powered vehicle unit comprising a propulsion device and a regenerative braking device connected to an energy source, wherein the self-powered vehicle unit is configured to:
   obtain a request for energy transfer from the self-powered vehicle unit to a target vehicle unit at least indirectly connected to the self-powered vehicle unit, determine a current state of charge of the energy source, and if the current state of charge is above a pre-determined level:
   acknowledge the request, and
   generate a positive torque by the propulsion device, thereby transferring an amount of energy from the energy source to an energy source of the target vehicle unit;

wherein the self-powered vehicle unit is further configured to perform at least one of the following items (i) to (iii):
   (i) synchronize an onset and a cessation of the generation of negative torque with a respective onset and cessation of the generation of positive torque,
   (ii) initialize the energy transfer operation in dependence of a distance remaining until the articulated vehicle combination reaches a pre-determined geographical location, and
   (iii) compensate, at least partly, for the negative torque by generating a total positive torque by the propulsion devices of a plurality of source vehicle units of the plurality of self-powered vehicle units.

\* \* \* \* \*